United States Patent [19]

Afshar et al.

[11] Patent Number: 5,313,516
[45] Date of Patent: May 17, 1994

[54] TELEPHONE ANSWERING DEVICE WITH AUTOMATIC FUNCTION

[75] Inventors: Eskandar Afshar, Lomita; Mark Karnowski, Garden Grove, both of Calif.

[73] Assignee: PhoneMate Inc., Torrance, Calif.

[21] Appl. No.: 883,045

[22] Filed: May 7, 1992

Related U.S. Application Data

[63] Continuation of Ser. No. 531,143, May 31, 1990, abandoned.

[51] Int. Cl.⁵ .................... H04M 1/57; H04M 1/65
[52] U.S. Cl. ......................... 379/67; 379/69; 379/88; 379/89; 379/142; 379/199
[58] Field of Search ............ 379/88, 89, 67, 69, 379/199, 188, 74, 77, 142

[56] References Cited

U.S. PATENT DOCUMENTS

| | | | |
|---|---|---|---|
| 4,065,642 | 12/1977 | McClure | 379/77 |
| 4,160,125 | 7/1979 | Bower et al. | 379/69 |
| 4,571,458 | 2/1986 | Bond | 379/77 |
| 4,582,956 | 4/1986 | Doughty | 379/94 |
| 4,602,129 | 7/1986 | Matthews et al. | 379/88 |
| 4,782,510 | 11/1988 | Szlam | 379/211 |
| 4,847,889 | 7/1989 | Eswaran | 379/77 |
| 4,873,713 | 10/1989 | Yamanouchi et al. | 379/69 |
| 4,903,289 | 2/1990 | Hashimoto | 379/61 |
| 4,985,913 | 1/1991 | Shalom et al. | 379/88 |
| 4,998,272 | 3/1991 | Hawkins, Jr. et al. | 379/88 |

FOREIGN PATENT DOCUMENTS

| | | | |
|---|---|---|---|
| 0059844 | 4/1985 | Japan | 379/88 |
| 0101155 | 5/1987 | Japan | 379/69 |
| 0267049 | 11/1988 | Japan | 379/69 |
| 0287248 | 11/1988 | Japan | 379/69 |

*Primary Examiner*—Thomas W. Brown
*Attorney, Agent, or Firm*—Frishauf, Holtz, Goodman & Woodward

[57] ABSTRACT

A Telephone Answering Device (TAD) has a message transfer system for notifying the owner that a message has been recorded on the TAD and permitting the owner to hear the message by having the TAD automatically dial a preprogrammed telephone number of a telephone at a second location. The TAD would play back a prerecorded audio message to the person picking up the telephone at the second location advising the person that a message has been recorded on the TAD. The TAD calls the preprogrammed telephone a number of times until the telephone at the second location is answered. If the telephone at the second location is not answered after the predetermined number of tries, the attempt to send the transfer message is discontinued.

14 Claims, 3 Drawing Sheets

TELEPHONE ANSWERING DEVICE WITH AUTOMATIC FUNCTION

This application is a continuation of application Ser. No. 07/531,143 filed May 31, 1990, abandoned.

BACKGROUND

Notifying an owner that messages that have been recorded on the incoming call recording tape in a telephone answering device is a convenient means to keep track of the receipt of important messages. This is particularly important for businessmen or people who are frequently away from home for extended periods of time. Such a system differs from TAD's that permit the owner to call his own TAD and retrieve, by use of a predetermined code or frequency, messages that have been recorded on the TAD played back to the owner, since such a system requires the owner to call the TAD repeatedly.

One message transfer system associated with a TAD is disclosed in the patent to McClure, U.S. Pat. No. 4,065,642. In the McClure device, if a person wishes to be notified that a message has been recorded by the TAD, the TAD is programmed to dial the preprogrammed telephone number where the owner intends to be reached. When the TAD detects that a new message has been received and stored in the Incoming Call Record (ICR) tape, the TAD automatically dials the preprogrammed number. If the call from the TAD is answered, the TAD sends a signal over the telephone line in the form of a tone, which is meant to alert the recipient of the call that a message has been recorded on the TAD. The recipient can then cause the TAD to play back the message recorded by entering the correct security code. There is no audio message indicating the meaning of the tone. After the recorded message has been played, the TAD disconnects the line and waits for the next incoming call.

In the McClure device, if the message transfer system finds the recipient's telephone number to be busy, it repeatedly dials the number allowing a certain time interval between successive attempts until the call is answered within a predetermined time limit. If the call is not answered within this time limit, it ceases its attempts to transfer the message.

In another prior art device sold by Panasonic, Model KX-T2632, the TAD calls the preprogrammed telephone number and plays the same message that it normally plays to prompt the caller to leave message.

Both the Panasonic and McClure devices have serious shortcomings. Unless the party receiving the message transfer call has prior knowledge of the meaning of the tone signal, he or she is likely to be confused. The tone signal that is generated by the McClure device provides no clue as to what it is. The recipient may not even realize that it is a message transfer signal. Similarly, in the Panasonic device, playing a message that prompts recipient of the call to leave d message wouldn't make any sense to someone who is not aware that it is a message transfer signal. Thus, in both instances, the recipient of such a call, especially if the recipient is one other than the TAD owner, is likely to just hang up.

Multiple messages on a single tape that can be played back to a caller have been employed, such as in the patent to Bond, U.S. Pat. No. 4,571,458. In the Bond patent, the caller is prompted to input a code if a particular message is desired. Also, in the patent to Eswaran, U.S. Pat. No. 4,847,889, different portions of an ICR tape can be accessed to play back different portions of a recorded tape. None of the above devices, however discloses use in a message transfer system as according to the present invention, as set forth hereinbelow.

SUMMARY OF THE INVENTION

The present invention incorporates a heretofore unavailable feature called a "Message Transfer Greeting" that is separate from the regular message greeting, which audibly announces the purpose of the call and gives the recipient the option of listening to his messages by prompting him to enter the correct security code. This transfer message may be recorded on the same tape as the original outgoing announcement tape, or on a separate recording tape like an ICR tape, or medium, such as on a chip. The TAD includes a memory for storing a preprogrammed telephone number and an automatic telephone dialing circuit. Upon sensing that a message has been recorded on the ICR tape, the TAD automatically dials the preprogrammed telephone number and when the call is answered, the message transfer greeting is played back to the recipient.

The recipient of the call can then activate the playback of the ICR tape.

To provide a better understanding of the Message Transfer Greeting, an example of the operation is provided as follows:

Consider a typical scenario in which Mr. Smith is going to his friend's house, another business, or even his car phone. Mr. Smith wishes to have an important message that he is expecting from his stock broker transferred to him. When the TAD at his office detects a message having been received by the ICR tape, it automatically dials the preprogrammed number of the second telephone. When the call is answered, the Message Transfer Greeting is played. The greeting would state, for example, "This is Mr. Smith's Telephone Answering Machine. There is a call for Mr. Smith . . . He has one message . . . Please enter the access code to hear the message". It would be readily apparent to any one hearing the transfer message, if Mr. Smith does not answer the telephone, that the message is for Mr. Smith and would summon him or leave a message. To provide sufficient time for Mr. Smith to get to the telephone and enter the access code, the announcement may be repeated several times.

In the event that the telephone answering device calls another telephone answering device, then the first telephone answering device would leave the Message Transfer Greeting on the second telephone answering device. The versatility of the system is further enhanced by incorporation of the following capabilities into the telephone answering device:

a. Monitoring of the progression of the message transfer call until the recipient is ready to receive the message. This capability is crucial because the system must respond correctly to a busy tone, or a no answer, by repeatedly calling the forwarding number with sufficient intervals between the calls, and/or playing the message transfer greeting only when the call is answered;

b. Remote activation and deactivation of the message transfer system;

c. Remote programming or changing of the forwarding telephone number that will be dialed by the message transfer system;

d. Remotely changes the message transfer greeting;

e. Accomplishes the above functions under the guidance of a speech assisted menu in the system;

f. Transfer of only those messages that have been recognized by the system to be urgent. If the recipient wishes to have only the urgent messages transferred to him, he can inform the potential callers, to enter a special "urgent transfer" code if they want their messages to reach him urgently. If the system is set to the "Urgent Message Transfer" mode, it will forward only messages with the urgent transfer code to the recipient; and g. Recognition of calls originating from a set of previously programmed "priority" numbers, and the capability to set the urgent transfer mode automatically for such calls. The ability to recognize the telephone number from which a call originates can be based on the technology described in the patent to Doughty, U.S. Pat. No. 4,582,956 or the transfer system can ask the caller to enter the telephone number or the last four digits of the telephone number.

OBJECTS OF THE INVENTION

It is an object of the present invention to provide a TAD with a message transfer mechanism that initiates a call to a preprogrammed telephone number when an incoming message has been recorded.

It is another object of the present invention to cause the message transfer greeting to be easily understandable to the recipient of the transfer message.

It is another object of the present invention to provide a transfer system that is easy to use.

It is an object of the present invention to provide means to optionally transfer only those messages that have been marked by the caller as being urgent by means of special codes.

These and other objects and advantages of the present invention will become apparent from a review of the following specifications and accompanying drawings.

DETAILED DESCRIPTION OF THE DRAWING

Figure 1:
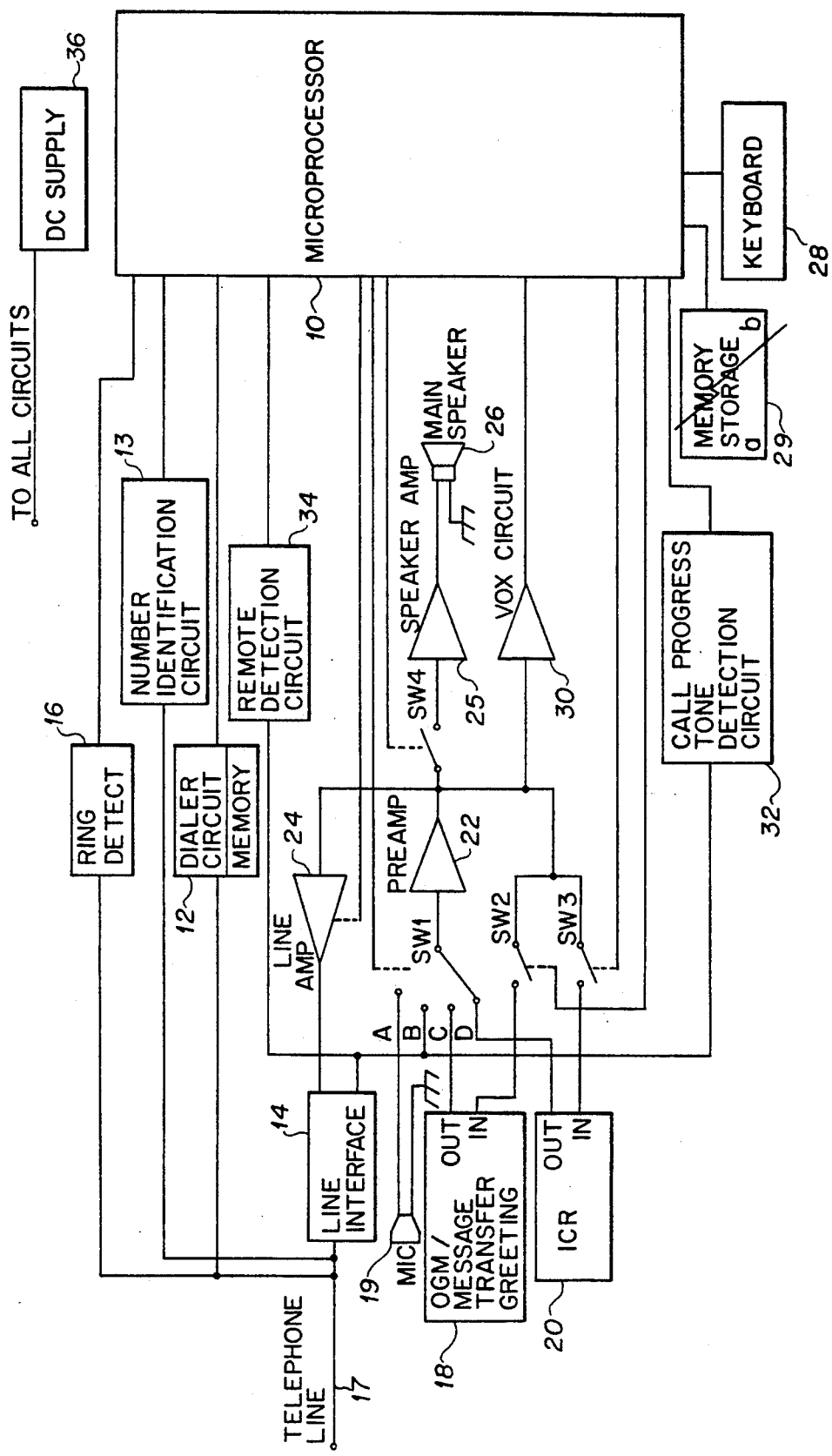
FIG. 1 is a block diagram of the components of the TAD incorporating the Message Transfer System.
Figure 2:
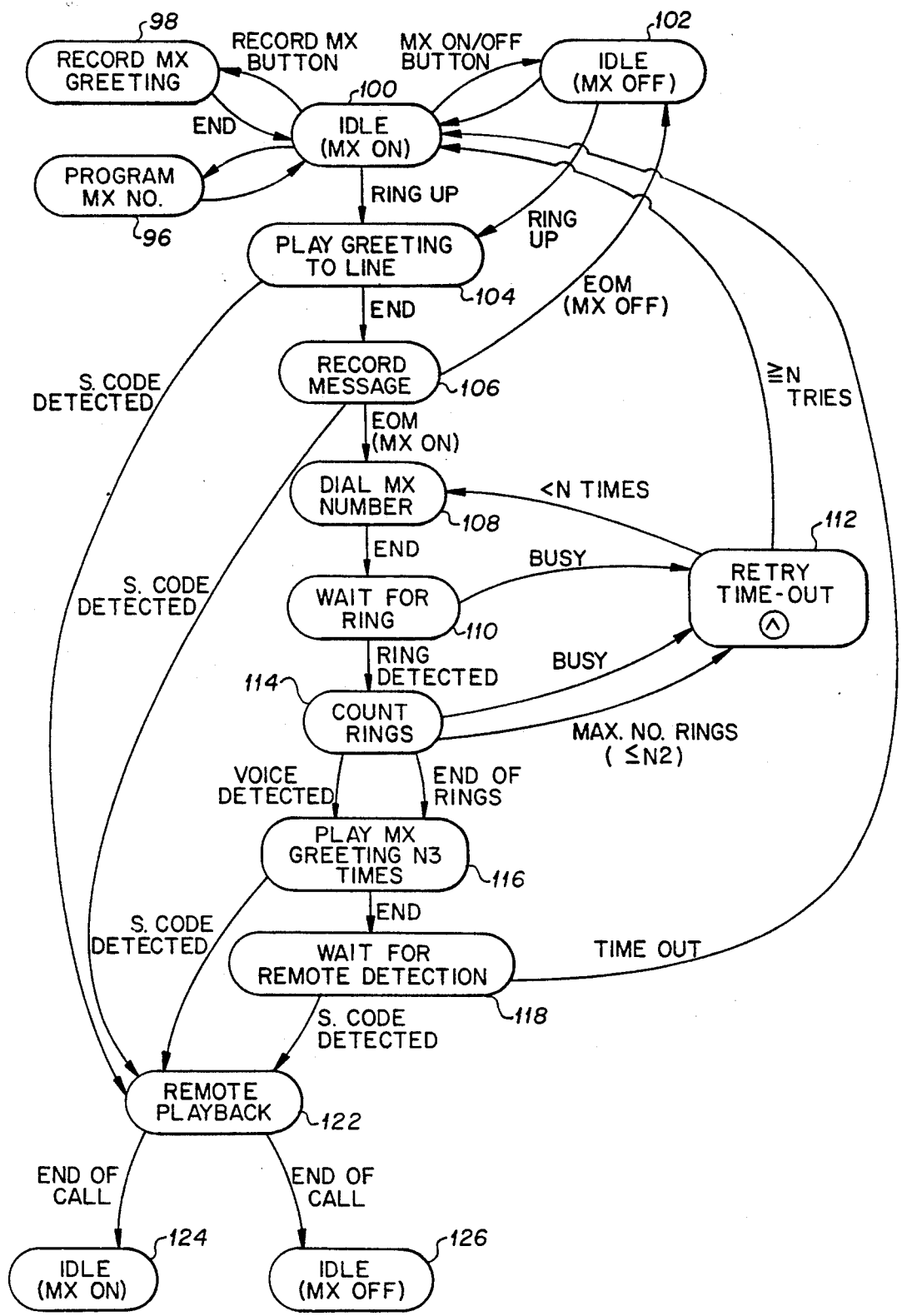
FIG. 2 is a flow diagram of the logic of the Message transfer system.
Figure 3:
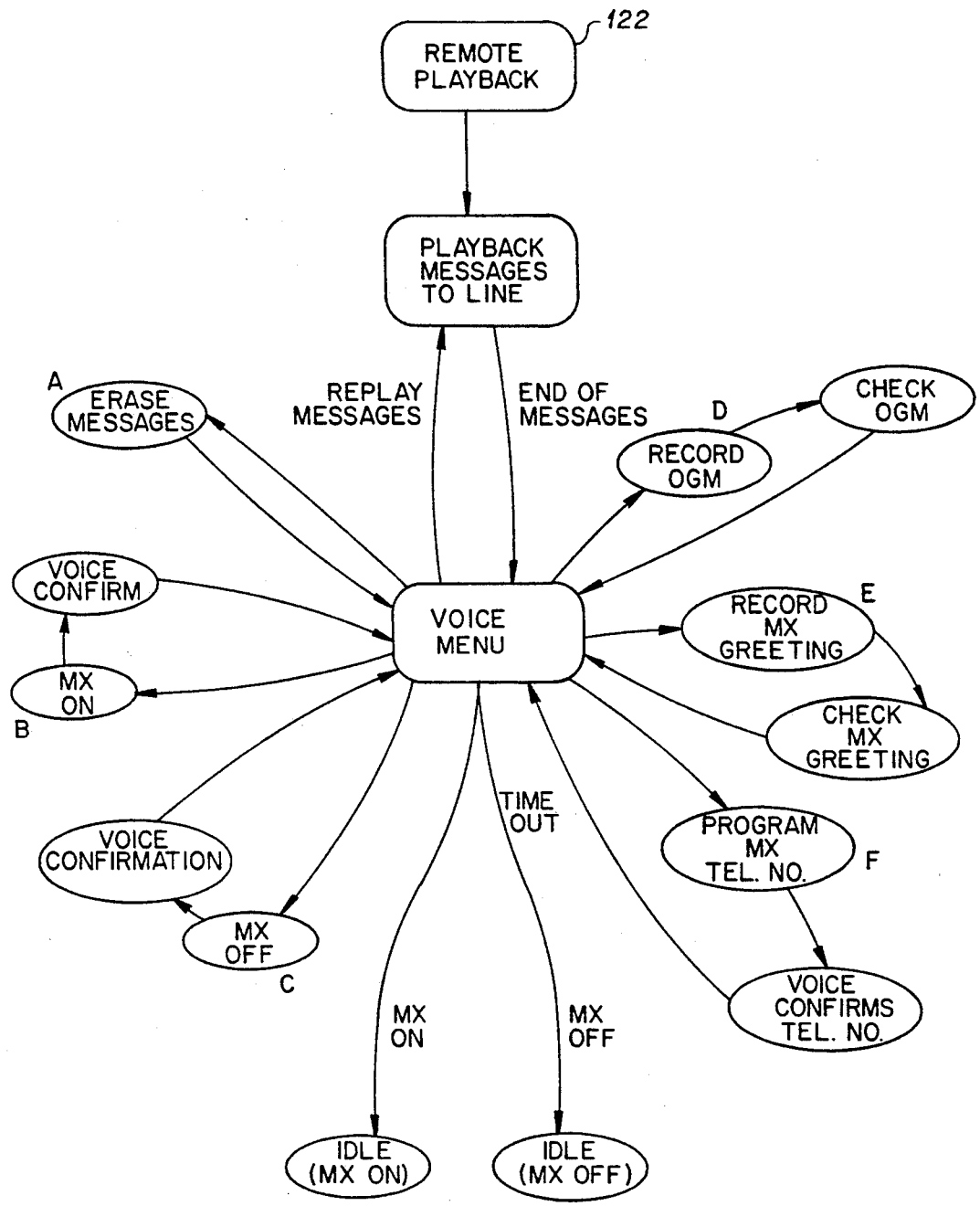
FIG. 3 is a flow diagram of the voice menu logic for controlling the message transfer system.

Referring the FIG. 1, the block diagram of a typical TAD incorporating the message transfer circuitry of the present invention is shown. The components and operation of a typical TAD are well known in the art and will not be describe in detail. The components of the TAD and a brief description follows:

A microprocessor 10 provides general control of the TAD and includes the software part of the message transfer algorithm which is described in greater detail in FIGS. 2 and 3.

A dialer circuit 12 is controlled by the microprocessor 10 to generate dialing signals to the telephone network.

A line interface 14 couples the audio signal from the telephone line 17 to the audio circuitry of the TAD.

A ring detect circuit 16 detects an incoming ring signal on the telephone line 17 and provides a signal to the microprocessor 10 upon detecting the ring signal.

An outgoing message block 18 in which both the announcement greeting and the message transfer greeting are recorded from the microphone 19, or the telephone line 17 via the line. The announcement greeting prompts a caller to leave a message, while the message transfer greeting is played to a second telephone to instruct an answering party that the owner of the TAD has a waiting message.

An incoming call recording (ICR) message block 20, records the caller's message through its input terminal and plays back the message through its out terminal;

Switches SW1–SW4, are controlled by the microprocessor 10 to provide a path for the audio signals that corresponds to the operative state of the TAD.

A preamp 22 amplifies the output of the line audio signal in preparation for playback or record;

A line amp 24 is enabled by the microprocessor 10 to send the output signal of the preamp 22 to the telephone line 17;

A speaker amp 25 amplifies the audio signal so that it can be played back through the main speaker 26;

A keyboard 28 is connected to the microprocessor 10, which allows the user to manually operate the TAD;

A memory storage 29 is connected to the microprocessor 10.

A VOX circuit 30 provides a logic level indication to the microprocessor 10 corresponding to the presence of audio signals on the telephone line 17. For example, a two second constant tone would cause the VOX circuit 30 to present a two second logic "high" pulse to the microprocessor 10. Conversely, speech signals would produce a series of short pulses due to the syllabic nature of human speech which would prevent the microprocessor 10 from hanging up.

A call progress tone detection circuit 32 specifically detects the tone frequencies that make up the standard call progress signals generated by the telephone network. For the message transfer function, the specific tones of interest are Dial Tone, Ringback Tone, and Busy Tone, each of which are unique signals.

A remote detection circuit 34 detects touch tone commands from a remote user and relays them to the microprocessor 10.

A DC Power Supply 36 provides electrical power to the above-mentioned circuitry.

As referred to above, the message transfer function of the TAD requires the TAD to be able to detect call progress signals such as the Dial Tone, Busy Tone, and the Ringback Tone that are generated by the telephone network. Detection of these tones can be accomplished by the following well known means:

The simplest way to detect these signals is to detect and decode the tone pairs that make up each signal. This provides the fastest and most reliable means of detecting the tones, at the expense of additional circuitry.

Another way to detect Call Progress signals is to detect them by their cadence using the VOX Circuit. On most telephone lines, the Dial Tone is continuous, the Ringback Tone is 2 seconds on and 4 seconds off, the Busy Tone is 0.5 seconds on and 0.5 seconds off, and speech would generate varying pulse lengths at the VOX circuit that would be generally much shorter than the above-mentioned signals. Using the VOX circuit, the Microprocessor can measure the duration of audio signals appearing on the telephone line, and thus identify Call Progress signals when they occur.

In the preferred embodiment of the present invention, the TAD consists of two message tapes, the first being a conventional Outgoing Message (OGM) tape that prompts the caller to leave a message and the second one, a conventional ICR tape that records the message. The ICR tape has two segments. The first segment stores the Message Transfer (MX) Greeting that is played at the time when a message is being transferred to a second telephone.

The MX greeting may be repeated by having the ICR tape rewind to the beginning of the second segment and playing it. Alternately, the same MX greeting can be recorded two or more times, contiguously in the second segment, so that if there is a TAD associated with the second telephone, the entire message will be recorded by the second TAD at least once. Otherwise, the OGM of the second TAD may prevent the recording of a portion of the MX greeting. This method ensures that at least during the second time that the MX greeting is played, it will be recorded on the second TAD.

In an alternate embodiment of the present invention, the TAD consists of two message tapes, the first being the conventional outgoing message recording/play back tape that prompts the caller to leave a message and the other the conventional incoming message recording (ICR) tape that records the message. The outgoing message recording tape has two portions. The first portion has the conventional outgoing message to a caller asking them to leave their name and telephone number and any other message. The second portion of the tape is the message that will be played back at the time that it is desired to have a message transferred to a second telephone.

The second portion of the tape may have the same message played back on two or more separate occasions so that if there is a telephone answering device associated with the second telephone, the entire message will be recorded by the second TAD. Otherwise, the outgoing message of the second TAD may be activated and that will prevent the recording of the first portion of the transfer message. In this way at least the second time that the play back of the message transfer greeting takes place it will be recorded by the second TAD.

The OGM tape is activated upon receipt of an incoming call and the caller is advised to leave a message. The OGM tape stops when it has completed the playback of the outgoing message and waits to see if a message is being left on the ICR tape if the transfer code is activated. If a message is left, then the TAD calls the number that has been stored in the dialing portion 12 of the TAD and upon detection of an of f hook signal at the second telephone to which the message is desired to be transferred, the second portion of the play back message consisting of the transfer message is played back. Upon the completion of the playback of the transfer message the first outgoing message tape rewinds to its initial position and is in position to respond to a second incoming call to the TAD. The message tape is controlled by the microprocessor 10.

In an alternative embodiment of the present invention, the messages can be stored on digital circuitry, rather than on tape. Such a system would permit the repeated playback of the transfer message a number of times without having to physically rewind tape to play back the MX transfer greeting.

Referring to FIG. 2, the flow diagram of the operational logic of the TAD incorporating the message transfer system is shown.

For the sake of convenience, we regard the Idle state—either in the "Message Transfer ON" mode (at 100) or in the "Message Transfer OFF" (at 102) mode—to be the base state. Typically, the transitions between the ON and the OFF positions of the message transfer are accomplished by activating a switch on the TAD. Programming the telephone number of the second telephone to which the recorded message transfer greeting is to be played by the TAD can be done at 96. In an alternative embodiment, more than one telephone number can be stored in memory, and the TAD can call the numbers sequentially, in the event there is no answer at the first telephone number. Also a new message transfer greeting can be recorded at 98 by switching of a "Record message transfer Greeting" button. Both these functions can also be remotely activated in a conventional manner.

As shown in FIG. 2, if the system is in the message transfer OFF mode 102 when a call is recorded by the TAD, the TAD plays the outgoing message greeting (104) after a predetermined number of rings and prompts the caller to leave a message. After the caller's message has been recorded (106) the system goes back into the idle state. If on the other hand, the system is in the message transfer ON mode 100 when a call is received, steps 104 and 106 are repeated as is in the previous case. However, when the of message (EOM) is detected, after an on-hook condition by an off-hook condition (to obtain a dial tone) the system dials the previously programmed message transfer number 108 and waits to hear the ringback signal from the second telephone 110. If the dialed number is busy, the system goes into RETRY TIMEOUT state 112, and waits for a predetermined amount of time before redialing the message transfer number 108. If the line continues to be busy, the steps 108 through 112 are repeated N times, where N is made reasonably large so that there is a good chance of getting through to the line. If the line continues to be busy even after N number of tries, the Retry Timeout goes into base state (100). In some situations, it could also happen that when the message transfer number is dialed, a ring is first detected at 110 but the line become busy after a few rings at 114. As before, the message transfer number is dialed up to N times with a predetermined length of wait time between each try, which is administered by the Retry Timeout step A. Even if the line is not busy, the message transfer number is redialed after a certain predetermined number of rings (N2). This is to ensure that if no one is present at the receiving end to attend the telephone, the telephone lines are not tied up indefinitely. Redialing after a reasonable interval takes into account the possibility that the receiving telephone had call waiting feature.

When the line is ringing but no one answers, it could be that there is no one to answer the telephone or it could also be that the receiving party is on the line, talking to someone else and chooses to ignore the call waiting signals. In any case, it makes sense to retry after some time. Hopefully, the person has either returned home or he is ready to attend the call.

If the recipient answers the telephone, the ringing ceases and a voice may be heard at 114. On detecting either a voice or the cessation of rings, the TAD plays the message transfer greeting N3, a predetermined number of times 116 so that even if some one other than the intended recipient answers the telephone, there is sufficient time for the recipient to get to the telephone and enter the security code. This can be accomplished by rewinding the tape to the beginning of the transfer message in the instance where a tape is used, or electronically if an electronic chip is used.

In one embodiment of the invention, if no security code is entered 118 by the recipient, after the message transfer greeting has been played N3 times, the system enters the "RETRY TIME-OUT" state B at 120. The Retry Time-out state redials the number and the steps 108 through 120 are repeated M times until a valid security code has been detected within M trials, the state B reverts to the idle state. Of course, if the call is answered by the recipient, he may enter the security code immediately without having to listen to the entire message transfer greeting. Once the security code is detected 118, the TAD plays the recorded transfer message 122. At the end of the call, the system reverts back to its idle state, either the message transfer ON 100 or the message transfer OFF 102 modes, depending on the initial base state and any change in the base state that may have been made remotely. For, example, the recipient may change the base state from message transfer ON to message transfer OFF remotely if he doesn't wish to have any more messages transferred. In another embodiment of the invention, if no security code is detected at 118, the system times out and goes into the IDLE Mode at 100.

The versatility of the system is further enhanced by the incorporation of a means to optionally transfer only those messages that have been designated as being urgent by means of a special code. If the recipient wishes to have only the urgent messages transferred to him, the recipient can set the TAD to the "Urgent Transfer" mode, and the TAD will forward only those messages that match the urgent transfer code to the recipient.

The TAD recognizes calls originating from a set of previously programmed "priority" telephone numbers, and has the capability to set the urgent transfer mode automatically for such calls. The ability to recognize the telephone number from which a call originates can be based on the technology described in the patent to Doughty, U.S. Pat. No. 4,582,956 (Doughty), and is hereby incorporated by reference in this application.

According to the present invention, as shown in FIG. 1, a number identification circuit 13 ascertains a caller's telephone number, and the system of the instant invention checks to see if that particular number is on the list of priority numbers stored in the telephone storage memory 29. If the number is on the list, any message recorded by the caller associated with that telephone number is considered "urgent" and the autodialer immediately dials the message transfer number to deliver the message associated with that telephone number.

Alternatively, the caller can be instructed to dial a specific code to designate the "urgent" transfer of the call.

FIG. 3 is a state diagram that describes in detail the various functions that can be activated through REMOTE PLAYBACK at step 122 of FIG. 2, with the help of voice menu.

The voice menu enables the remote user to activate the desired function by prompting him using synthesized voice to enter the appropriate touch tone command that corresponds to each function. For example, the voice menu instruction for programming a Message Transfer telephone number (F) change might state as follows:

"Please enter 7 if you wish to program a new Message Transfer telephone number".

Upon detection of code "7", the voice menu might further prompt the user to enter the telephone number and request that it be ended with, say a pound sign, to indicate the end of all the digits. Once the telephone number is entered correctly, the voice menu might confirm the telephone number by repeating the number just entered.

Similarly, other functions that are shown in the figure can be activated by following the systematic instructions provided by the voice menu. Some of the other functions are capable of:
1. erasing the messages (A)
2. activating the Message Transfer (MX) function (B)
3. deactivating the message transfer function (C)
4. recording a new Out Going Message (OGM) (D)
5. recording a new message transfer greeting (E)

The set of functions shown in the diagram is not exhaustive and it is to be understood that the diagram is merely meant to indicate the capability of the voice menu system.

After all the commands are entered or if no command has been entered within a specific time limit, the voice menu times out and the system reverts to one of the IDLE states.

While the present invention has been described with regards to the preferred embodiment, other embodiments of the present invention may be made which do not depart from the concept of the present invention.

What is claimed is:

1. A telephone answering device comprising:
   incoming message recording means for recording and playing back messages from a caller;
   outgoing message recording means for recording and playing back a plurality of messages prerecorded by an owner, including a transfer message for audibly indicating that a message has been recorded on said incoming message recording means by a caller;
   automatic dialing means including means for storing at least one message transfer telephone number of a remote telephone and means for automatically dialing said at least one message transfer telephone number;
   telephone number memory storage means for storing a plurality of telephone numbers of potential callers; and
   control means including:
   means for activating said automatic dialing means to dial said at least one message transfer telephone number when an incoming message from a caller, having a telephone number matching one of said plurality of telephone numbers stored in said telephone number memory storage means, is recorded in said incoming message recording means;
   means for controlling playback of said transfer message recorded in said outgoing message recording means when a voice signal from the remote telephone is detected;
   means for sensing a busy tone indicating an in-use condition of a telephone line to which the remote telephone is connected;
   means for sensing and counting a predetermined number of ringback tones indicating that the called party is unavailable;
   means for automatically redialing said at least one message transfer telephone number at a predetermined time after a busy tone or said predetermined number of ringback tones is sensed and counted; and means for permitting remote control of at least one function relating to transfer of messages recorded in said outgoing message recording means and incoming recording means, said at least one function including remotely changing said at least one message transfer telephone number which said automatic dialing means automatically dials when activated by said control means in response to a recording of an incoming message on said incoming recording means.

2. The telephone answering device of claim 1, wherein said control means includes means for repeatedly automatically redialing said at least one message transfer telephone number at a predetermined time after each sensing of a busy tone or a ringback tone, until a voice signal from the remote telephone is detected and said transfer message is played back.

3. The telephone answering device of claim 1, wherein said control means includes means for being remotely controlled so as to selectably activate said automatic dialing means when an incoming message is recorded in said incoming message recording means.

4. The telephone answering device of claim 1, wherein said telephone number storage means includes means for being remotely programmable so that a new telephone number can be stored therein.

5. The telephone answering device of claim 1, wherein said outgoing message recording means includes means for permitting remote rerecording of one of said plurality of prerecorded outgoing messages.

6. The telephone answering device of claim 1, wherein said outgoing message recording means includes means for permitting remote rerecording of said transfer message.

7. The telephone answering device of claim 1, further comprising a speech assisted menu means for guiding remote control operations.

8. The telephone answering device of claim 1 further comprising identifying and comparing means, coupled to said control means, for identifying a telephone number of an incoming caller and comparing said identified telephone number with said plurality of telephone numbers stored in said telephone number memory storage means;

said control means selectably activating said automatic dialing means to dial said at least one message transfer telephone number when an incoming message from a caller, having a telephone number identified by said identifying and comparing means as matching one of said plurality of telephone numbers stored in said telephone number memory storage means, is recorded in said incoming message recording means.

9. The telephone answering device of claim 1, wherein said outgoing message recording means includes a prerecorded message recorded therein instructing a caller to enter a touch tone code, said telephone answering device further comprising memory means for storing a plurality of codes, and said control means activating said automatic dialing means to dial said at least one transfer telephone number when said code entered by the caller matches one of said plurality of codes stored in said memory means.

10. The telephone answering device of claim 9 wherein said control means activating said automatic dialing means to dial said at least one transfer telephone number when said code entered by the caller matches, at least in part, one of said plurality of codes stored in said code memory means.

11. A telephone answering device comprising:

incoming message recording means for recording and playing back messages from a caller, said incoming message means including means for permitting a caller to selectably identify messages as urgent messages;

outgoing message recording means for recording and playing back a plurality of messages prerecorded by an owner, including a transfer message for audibly indicating that a message has been recorded on said incoming message recording means by a caller;

automatic dialing means including means for storing at least one message transfer telephone number of a remote telephone and means for automatically dialing said at least one message transfer telephone number;

number memory storage means for storing a plurality of numbers; and control means including:

means for activating said automatic dialing means to dial said at least one message transfer telephone number when an incoming message identified as an urgent message is recorded in said incoming message recording means;

means for controlling playback of said transfer message recorded in said outgoing message recording means when a voice signal from the remote telephone is detected;

means for sensing a busy tone indicating an in-use condition of a telephone line to which the remote telephone is connected;

means for sensing and counting a predetermined number of ringback tones indicating that the called party is unavailable;

means for automatically redialing said at least one message transfer telephone number at a predetermined time after a busy tone or said predetermined number of ringback tones is sensed and counted; and means for permitting remote control of at least one function relating to transfer of messages recorded in said outgoing message recording means and incoming recording means, said at least one function including remotely changing said at least one message transfer telephone number which said automatic dialing means automatically dials when activated by said control means in response to a recording of an incoming message on said incoming recording means.

12. The telephone answering device of claim 11 wherein said identification of an urgent message comprises the caller entering a code corresponding to one of said plurality of numbers stored in said number memory storage means.

13. The telephone answering device of claim 11 wherein said identification of an urgent message comprises an automatic matching of the caller's telephone number with one of said plurality of numbers stored in said number memory storage means.

14. A telephone answering device comprising:

incoming message recording means for recording and playing back messages from a caller, said incoming message means including means for permitting a caller to selectably identify messages as urgent messages;

outgoing message recording means for recording and playing back a plurality of messages prerecorded by an owner, including a transfer message for audibly indicating that a message has been recorded on said incoming message recording means by a caller;

automatic dialing means including means for storing at least one message transfer telephone number of a remote telephone and means for automatically dialing said at least one message transfer telephone number;

telephone number memory storage means for storing a plurality of telephone numbers of potential callers, said telephone number storage means including means for being remotely programmable so that a new telephone number can be stored therein;

speech assisted menu means for guiding remote control operations;

identifying and comparing means for identifying a telephone number of an incoming caller and for comparing said identified telephone number with said plurality of telephone numbers stored in said telephone number memory storage means; and control means including:

means for selectably activating said automatic dialing means to dial said at least one message transfer telephone number responsive to recording of an incoming message in said incoming message recording means from one of a caller having a telephone number identified by said comparing and identifying means as matching one of said plurality of telephone numbers stored in said telephone number memory storage means and a caller who has identified his incoming message as an urgent message;

means for controlling playback of said transfer message recorded in said outgoing message recording means when a voice signal from the remote telephone is detected;

means for sensing a busy tone indicating an in-use condition of a telephone line to which the remote telephone is connected;

means for sensing and counting a predetermined number of ringback tones indicating that the called party is unavailable;

means for repeatedly automatically redialing said at least one message transfer telephone number at a predetermined time after each sensing of a busy tone or said predetermined number or ringback tones is sensed and counted, until a voice signal from the remote telephone is detected and said transfer message is played back; and means for permitting remote control of at least one function relating to transfer of messages recorded in said outgoing message recording means and incoming recording means, said at least one function including remotely changing said at least one message transfer telephone number which said automatic dialing means automatically dials when activated by said control means in response to a recording of an incoming message on said incoming recording means.

* * * * *